(12) United States Patent
Akita et al.

(10) Patent No.: US 8,829,863 B2
(45) Date of Patent: Sep. 9, 2014

(54) FIELD WINDING TYPE ROTARY ELECTRIC MACHINE

(75) Inventors: Kenichi Akita, Chiyoda-ku (JP); Kenji Nakajima, Chiyoda-ku (JP); Masato Mori, Chiyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 13/328,400

(22) Filed: Dec. 16, 2011

(65) Prior Publication Data

US 2012/0293139 A1 Nov. 22, 2012

(30) Foreign Application Priority Data

May 19, 2011 (JP) ................................. 2011-112265

(51) Int. Cl.
*H02P 9/00* (2006.01)
*H02P 9/10* (2006.01)

(52) U.S. Cl.
CPC ........................................ *H02P 9/10* (2013.01)
USPC ................................. 322/44; 322/24; 322/28

(58) Field of Classification Search
USPC ............ 322/24, 28, 89, 44, 59; 700/286, 287, 700/288
See application file for complete search history.

(56) References Cited

U.S. PATENT DOCUMENTS

| | | | | |
|---|---|---|---|---|
| 5,444,354 A * | 8/1995 | Takahashi et al. | ............... | 322/28 |
| 6,121,757 A * | 9/2000 | Takahashi et al. | ............... | 322/28 |
| 7,235,952 B2 * | 6/2007 | Maehara | ........................ | 322/24 |
| 7,292,007 B2 * | 11/2007 | Aoyama | ........................ | 322/24 |
| 7,486,052 B2 * | 2/2009 | Sumimoto | ...................... | 322/24 |
| 7,570,027 B2 * | 8/2009 | Teramoto et al. | ............... | 322/24 |
| 7,687,929 B2 * | 3/2010 | Fattal | ........................ | 290/40 C |
| 7,956,584 B2 * | 6/2011 | Peterson et al. | ................ | 322/44 |
| 8,155,795 B2 * | 4/2012 | Ohuchi et al. | ................ | 700/291 |
| 8,334,680 B2 * | 12/2012 | Akita et al. | ..................... | 322/59 |
| 2004/0008009 A1 * | 1/2004 | Fukaya | ........................ | 322/44 |
| 2005/0135133 A1 * | 6/2005 | Maehara | ....................... | 363/144 |
| 2008/0106240 A1 * | 5/2008 | Sumimoto | ...................... | 322/15 |
| 2010/0301816 A1 * | 12/2010 | Akita et al. | ..................... | 322/34 |

FOREIGN PATENT DOCUMENTS

| | | |
|---|---|---|
| JP | 60-51421 A | 3/1985 |
| JP | 4-229100 A | 8/1992 |
| JP | 8-9567 A | 1/1996 |
| JP | 2010-279085 A | 12/2010 |

\* cited by examiner

*Primary Examiner* — Tulsidas C Patel
*Assistant Examiner* — Viet Nguyen
(74) *Attorney, Agent, or Firm* — Sughrue Mion, PLLC

(57) ABSTRACT

A field winding type rotary electric machine includes: a controller; a field current integration portion provided in the controller to calculate an integral value by integrating an excessive field current exceeding a field current threshold; a field current limiting portion provided in the controller and carrying out limiting processing to limit a field current to or below a predetermined value when the integral value reaches an integral value threshold defined as a reference value at or above which the field current is limited; a controller power supply connection switch switched ON and OFF for power feeding to the controller; a controller power supply connection determination portion switching ON and OFF the controller power supply connection switch; and a power feeding ON state maintaining portion maintaining an ON state of the power feeding to the controller from start to end of the limiting processing by the field current limiting portion.

10 Claims, 8 Drawing Sheets

FIELD WINDING TYPE ROTARY ELECTRIC MACHINE

BACKGROUND OF THE INVENTION

1. Field of the Invention

The present invention relates to a field winding type rotary electric machine chiefly incorporated into a vehicle and provided with a control apparatus as well as having an armature winding and a field winding.

2. Background Art

A rotary electric machine for vehicle is generally incorporated into an engine room. An operating temperature of the rotary electric machine for vehicle is therefore extremely high. An internal temperature of the rotary electric machine for vehicle rises further due to heat generated by the rotary electric machine for vehicle in association with power generating and driving operations. Hence, when a temperature of the rotary electric machine for vehicle rises exceedingly due to a continuous operation over a long period, the rotary electric machine for vehicle may possibly break down because of damage on inner parts.

To overcome this inconvenience, an output control method and an output control apparatus of an AC generator for vehicle in the related art propose a technique as follows as a prevention of a breakdown of the AC generator for vehicle caused by a rise in temperature. That is, a temperature of the AC generator or ambient temperature thereof is measured and an output current of the AC generator is limited upon detection of the measured temperature exceeding a pre-set abnormal temperature value so that thermal burden on the control apparatus is lessened (see, for example, Patent Document 1).

The output control method and the output control apparatus described in Patent Document 1, however, protect the AC generator for vehicle against a rise in temperature by limiting a field current according to the temperature of the AC generator for vehicle detected by a temperature sensor. Accordingly, there is a need to incorporate the temperature sensor and this need poses a problem that the cost of the AC generator for vehicle increases and the structure thereof has to be changed.

To eliminate this problem, Patent Document 2 describes a technique to prevent an excessive rise in temperature by limiting a field current to be passed to a range within which no damage is caused by heat generation in a case where a field current flowing to a field winding remains at or above a predetermined threshold value for a predetermined time.

Patent Document 1: JP-A-8-9567 (FIG. 1 and a description thereof)

Patent Document 2: JP-A-2010-279085 (FIG. 3 and a description thereof)

The AC generator for vehicle described in Patent Document 2, however, is silent about a case where an initial temperature condition of the AC generator for vehicle is unknown, such as at the start-up of the power supply. For example, in a case where the internal temperature of the AC generator for vehicle is high at the start-up of the power supply, it is difficult to prevent a rise in temperature at appropriate timing with the technique in the related art in which no temperature sensor is incorporated. Hence, in such a case, an excessive rise in temperature may possibly give rise to damage on the AC generator for vehicle.

SUMMARY OF THE INVENTION

The invention was devised to solve the problems discussed above and has an object to provide a field winding type rotary electric machine requiring no temperature sensor and capable of suppressing a rise in temperature by limiting a field current flowing to a field winding and hence capable of preventing damage caused by a rise in temperature in a reliable manner even when an initial condition is unknown, such as at the start-up of the power supply.

A field winding type rotary electric machine according to an aspect of the invention includes: a controller; a field current integration portion that is provided in the controller and calculates an integral value by integrating an excessive field current exceeding a field current threshold; a field current limiting portion that is provided in the controller and carries out limiting processing to limit a field current to or below a predetermined value when the integral value calculated by the field current integration portion reaches an integral value threshold defined as a reference value at or above which the field current is limited; a controller power supply connection switch that is switched ON and OFF for power feeding to the controller; a controller power supply connection determination portion that switches ON and OFF the controller power supply connection switch; and a power feeding ON state maintaining portion that maintains an ON state of the power feeding to the controller from start to end of the limiting processing by the field current limiting portion.

According to an aspect of the invention, the field winding type rotary electric machine includes: the controller; the field current integration portion that is provided in the controller and calculates an integral value by integrating an excessive field current exceeding the field current threshold; the field current limiting portion that is provided in the controller and carries out the limiting processing to limit a field current to or below a predetermined value when the integral value calculated by the field current integration portion reaches the integral value threshold defined as the reference value at or above which the field current is limited. The field winding type rotary electric machine further includes the controller power supply connection switch that is switched ON and OFF for power feeding to the controller; the controller power supply connection determination portion that switches ON and OFF the controller power supply connection switch; and the power feeding ON state maintaining portion that maintains an ON state of the power feeding to the controller from start to end of the limiting processing by the field current limiting portion. It thus becomes possible to obtain a field winding type rotary electric machine capable of limiting the field current in a reliable manner so as to prevent a temperature of the field current type rotary electric machine from rising excessively by monitoring the field current flowing to the field current.

The foregoing and other object, features, aspects, and advantages of the present invention will become more apparent from the following detailed description of the present invention when taken in conjunction with the accompanying drawings.

DESCRIPTION OF THE PREFERRED EMBODIMENT

First Embodiment

Figure 1:
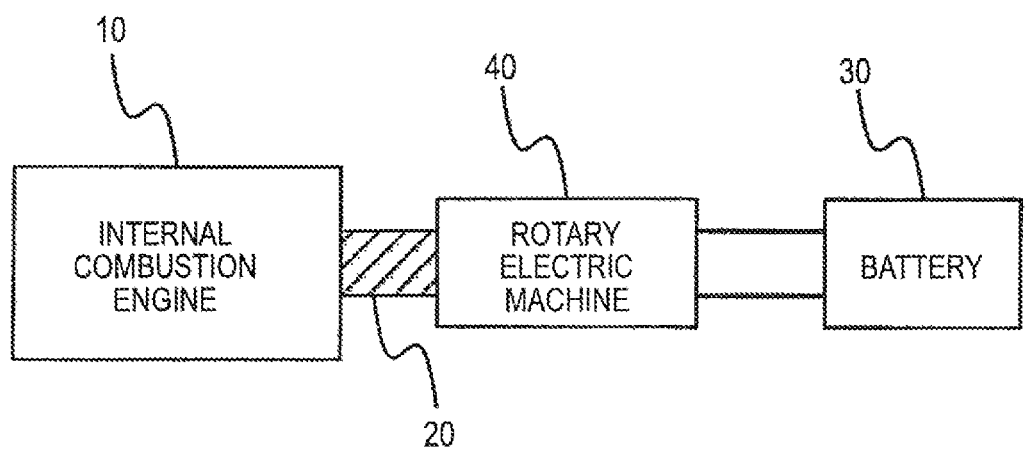
FIG. 1 is a view schematically showing the configuration when a field winding type rotary electric machine of the invention is incorporated into a vehicle.

Hereinafter, a field winding type rotary electric machine according to a first embodiment of the invention will be described with reference to FIG. 1 through FIG. 8. Like components are labeled with like reference numerals in the respective drawings.

FIG. 1 is a view schematically showing the configuration when the field winding type rotary electric machine of the first embodiment is incorporated into a vehicle. As is shown in the drawing, a field winding type rotary electric machine 40 is connected to an internal combustion engine 10 via a connection portion 20, such as a belt and pulleys. Also, a battery 30 is electrically connected to the field winding type rotary electric machine 40. It should be noted that there is a case where the field winding type rotary electric machine 40 is directly connected to the internal combustion engine 10 without using the connection portion 20. Further, the internal combustion engine 10 is not limited to either a gasoline engine or a diesel engine. Furthermore, the battery 30 may be dedicated to the field winding type rotary electric machine 40 or shared by a load for vehicle other than the field winding type rotary electric machine 40.

Figure 2:
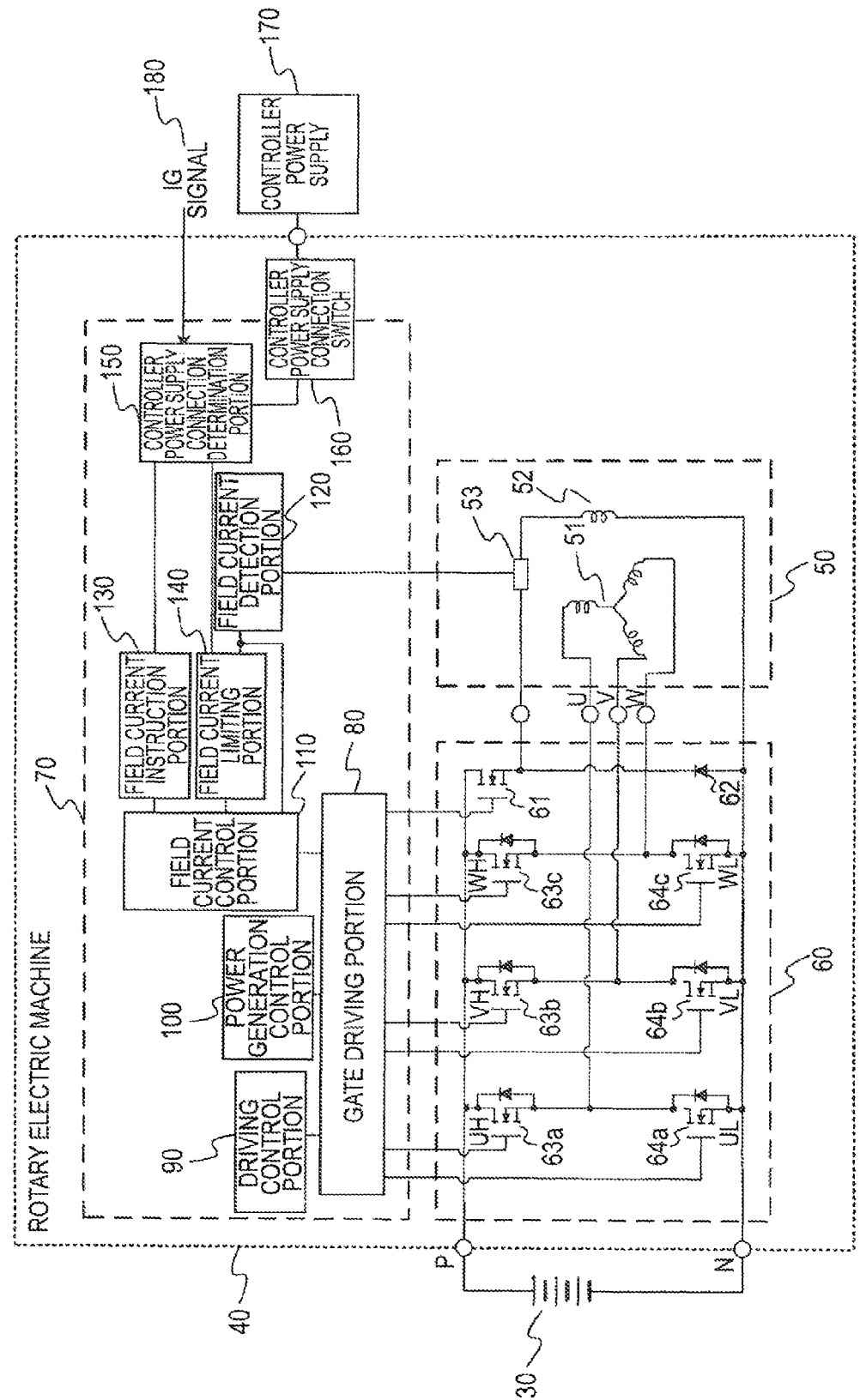
FIG. 2 is a view showing the configuration of a field winding type rotary electric machine according to a first embodiment of the invention.
Figure 3:
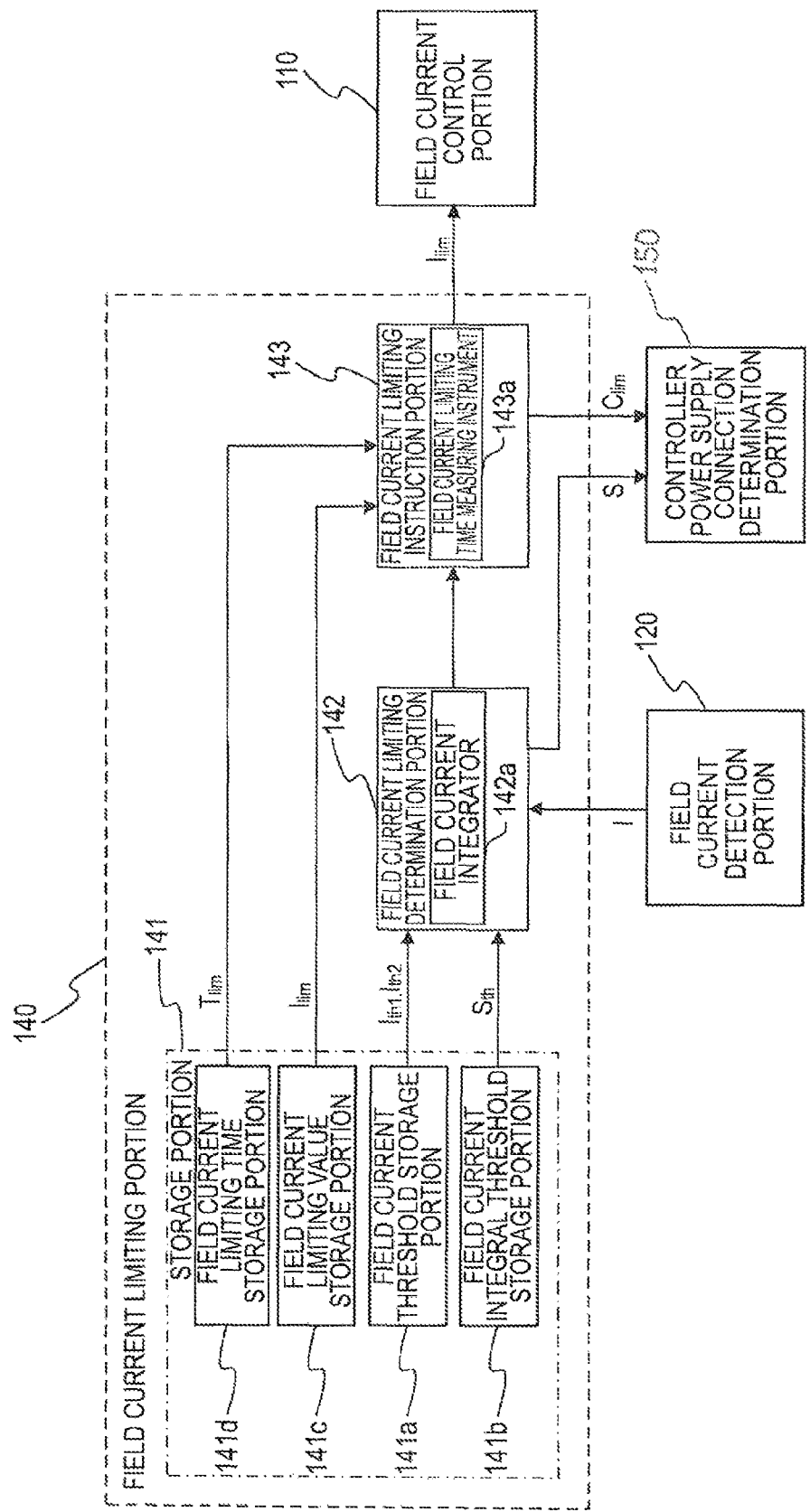
FIG. 3 is a view showing the configuration of a field current limiting portion of FIG. 2 according to the first embodiment of the invention.
Figure 4:
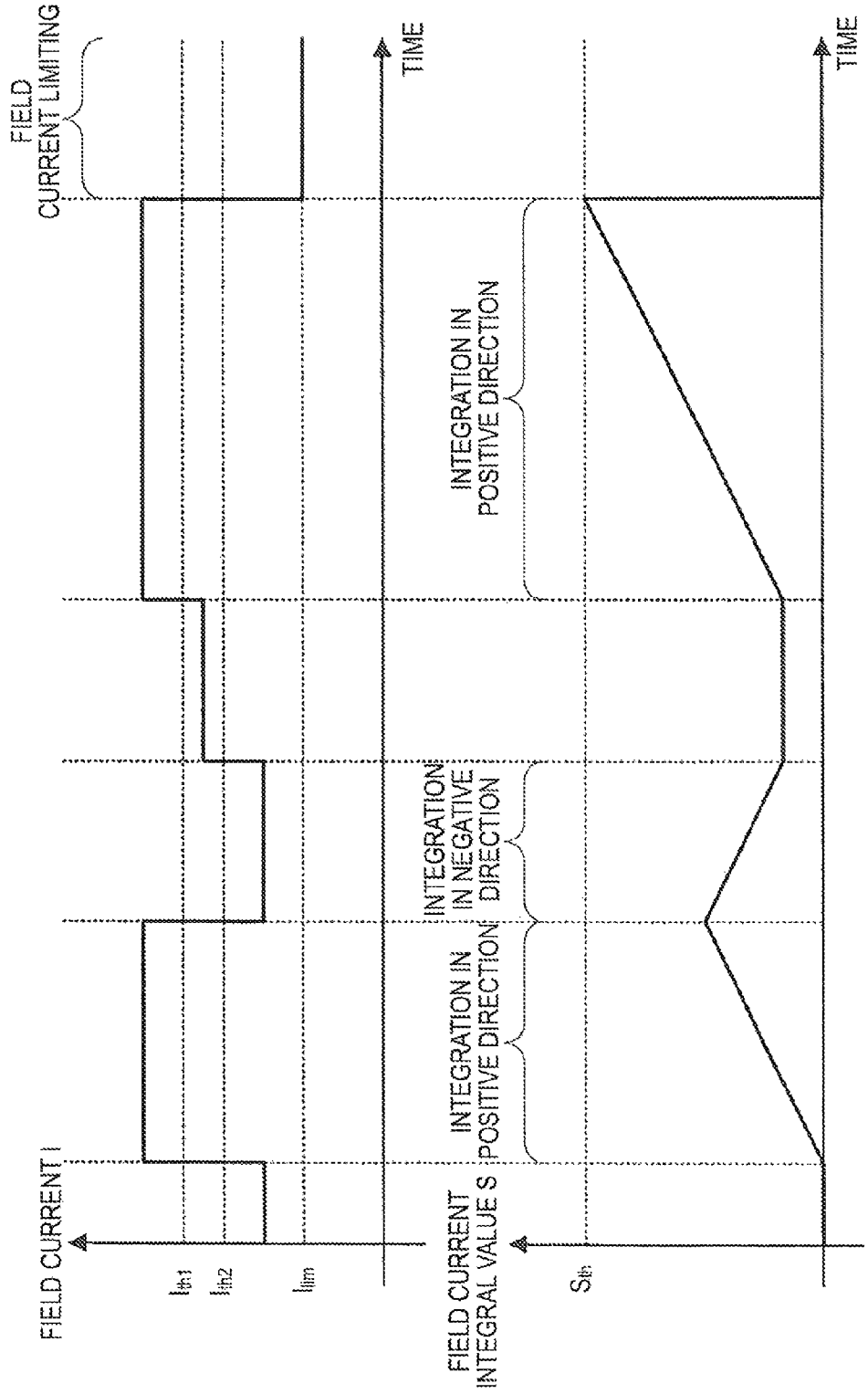
FIG. 4 is a view showing time changes of a field current and a field current integral value in the field current limiting portion according to the first embodiment of the invention.
Figure 5:
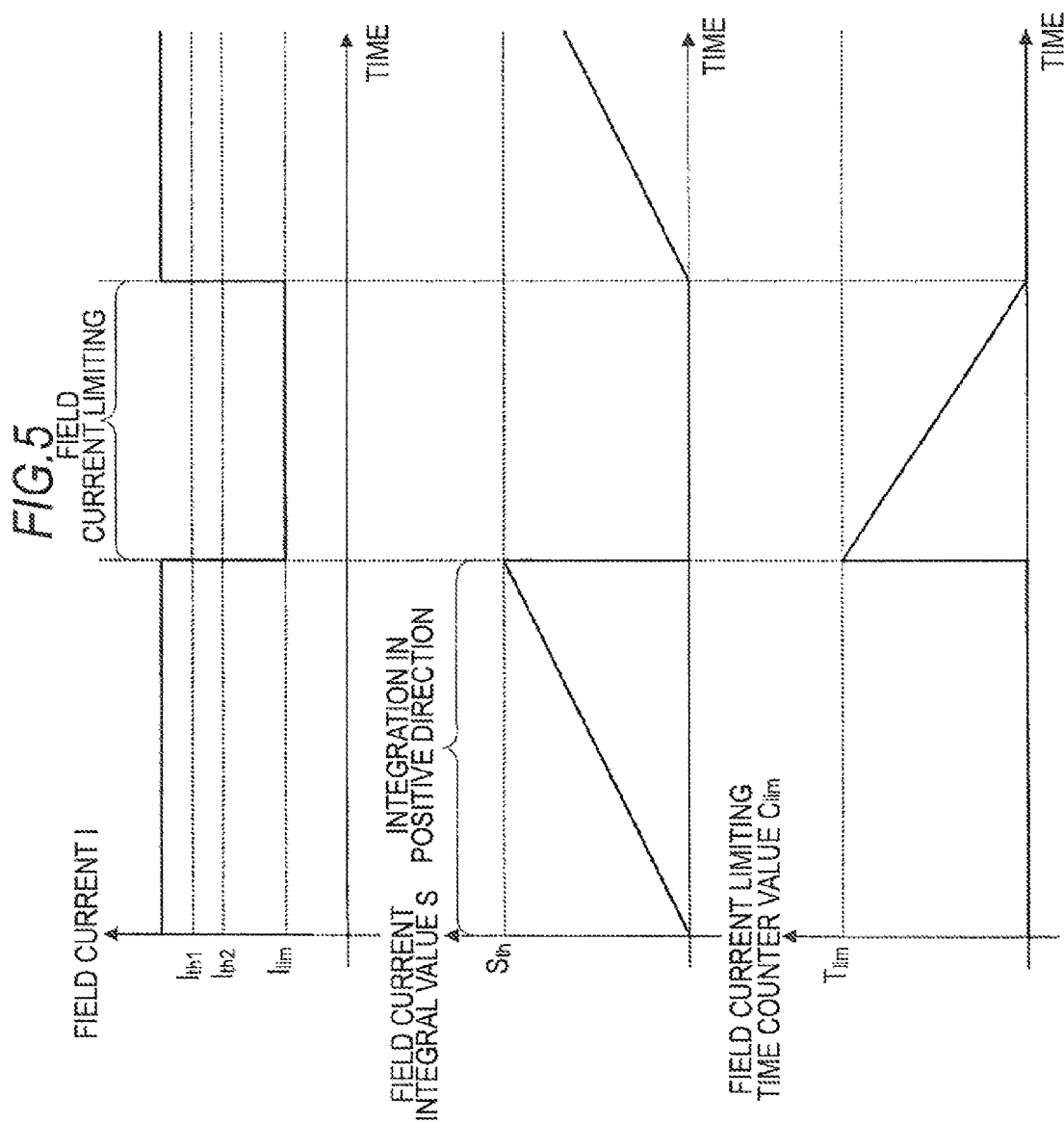
FIG. 5 is a view showing time changes of a field current, a field current integral value, and a field current limiting time counter value in the field current limiting portion according to the first embodiment of the invention in a case where the field current is limited.

FIG. 2 is a view showing the configuration of the field winding type rotary electric machine 40. FIG. 3 is a view showing the configuration of a field current limiting portion of the field winding type rotary electric machine 40. FIG. 4 is a view showing time changes of a field current and a field current integral value in the field current limiting portion.

As is shown in FIG. 2, the field winding type rotary electric machine 40 is formed of three prominent parts: a motor generator 50, a power converter 60, and a controller 70. The battery 30 is connected to the power converter 60 so that the power converter 60 receives a supply of power from the outside. Also, a controller power supply 170 is connected to the controller 70 and a controller power supply connection switch 160 switches ON and OFF states of a connection to the controller power supply 170.

The motor generator 50 includes a Y-connected or delta-connected three-phase armature winding 51, a field winding 52, and a current detector 53. It should be noted that the motor generator 50 may use an armature winding 51 other than a three-phase armature winding. The power converter 60 includes a field winding current switching element 61 connected to the field winding 52 with a three-phase inverter, power conversion switching elements 63a through 63c and 64a through 64c connected to the respective phases of a flywheel diode 62 and the armature winding 51. The controller 70 includes a gate driving portion 80, a driving control portion 90, a power generation control portion 100, a field current control portion 110, a field current detection portion 120, a field current instruction portion 130, a field current limiting portion 140, a controller power supply connection determination portion 150, and the controller power supply connection switch 160.

The gate driving portion 80 drives the motor generator 50 or controls power generation thereof by driving the field winding current switching element 61 and the power conversion switching elements 63a through 63c and 64a through 64c according to ON and OFF instructions for the armature winding 51 and the field winding 52 sent from the driving control portion 90, the power generation control portion 100, and the field current control portion 110. The driving control portion 90 controls ON and OFF timings of the power conversion switching elements 63a through 63c and 64a through 64c when the motor generator 50 is driven. Further, the power generation control portion 100 controls ON and OFF timings of the power conversion switching elements 63a through 63c and 64a through 64c for synchronous rectification while the motor generator 50 is generating power.

The field current detection portion 120 detects a field current I flowing to the field winding 52 by means of the current detector 53. The field current instruction portion 130 sends to the field current control portion 110 a field current instruction value $I_r$ for which the field current I is set as a control target.

The field current limiting portion 140 determines whether the field current I is to be limited according to the field current I detected by the field current detection portion 120. In a case where a need to limit the field current I is determined as the result, the field current limiting portion 140 sends a field current limiting value $I_{lim}$ to the field current control portion 110.

The controller power supply connection determination portion 150 switches ON and OFF the controller power supply connection switch 160 according to an ON or OFF state of an IG signal 180 inputted from the outside and an instruction from the field current limiting portion 140.

Herein, upon receipt of the field current limiting value $I_{lim}$ from the field current limiting portion 140, the field current control portion 110 sends a signal that controls the field current I to be flown to the field winding 52 to the gate driving portion 80 by setting the field current limiting value $I_{lim}$ as a control target value. It should be noted, however, that in a case where the field current instruction value $I_r$ is smaller than the field current limiting value $I_{lim}$, that is, a relation, field current instruction value $I_r$<field current limiting value $I_{lim}$, is established, the field current control portion 110 sends a signal that controls the field current I to take the field current instruction value $I_r$. In a case where the field current control portion 110 does not receive the field current limiting value $I_{lim}$ from the field current limiting portion 140, the field current control portion 110 constantly sends a signal that controls the field current I to be flown to the field winding 52 according to the field current instruction value $I_r$.

An operation of the field winding type rotary electric machine 40 will now be described in detail with reference to FIG. 3 showing the configuration of the field current limiting portion 140 and FIG. 4 showing time changes of the field current I and a field current integral value in the field current limiting portion 140.

The field current limiting portion 140 includes a storage portion 141, a field current limiting determination portion 142, and a field current limiting instruction portion 143. The storage portion 141 includes a field current threshold storage portion 141a, a field current integral threshold storage portion 141b, a field current limiting value storage portion 141c, and a field current limiting time storage portion 141d. The field current limiting determination portion 142 includes a field current integrator 142a and the field current limiting instruction portion 143 includes a field current limiting time measuring instrument 143a.

The field current threshold storage portion 141a pre-stores a first field current threshold $I_{th1}$ and a second field current threshold $I_{th2}$ set to a value smaller than the first field current threshold $I_{th1}$. In short, the relation between the first and second field current thresholds $I_{th1}$ and $I_{th2}$ is expressed as: first field current threshold $I_{th1}$>second field current threshold $I_{th2}$.

Also, the field current integral threshold storage portion 141b pre-stores a field current integral threshold $S_{th}$ and the field current limiting determination portion 142 is connected thereto.

The field current limiting value storage portion 141c pre-stores the field current limiting value $I_{lim}$. The field current limiting time storage portion 141d pre-stores a field current limiting time $T_{lim}$ of the field current I.

An operation of the field current limiting determination portion 142 will now be described with reference to FIG. 4. Firstly, in a case where a relation, field current I>first field current threshold $I_{th1}$, is established, the field current limiting determination portion 142 adds a difference $\Delta I_1$ between the field current I and the first field current threshold $I_{th1}$ to a field current integral value S (integration in the positive direction). On the contrary, in a case where a relation, field current I<second field current threshold $I_{th2}$, is established, the field current limiting determination portion 142 subtracts a difference $\Delta I_2$ between the second field current threshold $I_{th2}$ and the field current I from the field current integral value S (integration in the negative position). Meanwhile, the field current limiting determination portion 142 maintains the current field current integral value S in a case where both the following relations are established: field current I≤first field current threshold $I_{th1}$ and field current I≥second field current threshold $I_{th2}$.

Subsequently, in a case where a relation, field current integral value S>field current integral threshold $S_{th}$, is established, the field current limiting determination portion 142 determines that it is necessary to limit the field current I. The field current limiting determination portion 142 then sends a determination result to the field current limiting instruction portion 143.

According to the determination result of the field current limiting determination portion 142 indicating a need to limit the field current I, the field current limiting instruction portion 143 obtains the field current limiting value $I_{lim}$ from the field current limiting value storage portion 141c and the field current limiting time $T_{lim}$ from the field current limiting time storage portion 141d and sets the field current limiting time $T_{lim}$ to a field current limiting time counter value $C_{lim}$ in accordance with Equation (1) as follows:

$$C_{lim}=T_{lim} \quad (1).$$

The field current limiting instruction portion 143 sends the field current limiting value $I_{lim}$ to the field current control portion 110 during the field current limiting time $T_{lim}$. Accordingly, upon receipt of the field current limiting value $I_{lim}$, the field current control portion 110 controls the field current I to take the field current limiting value $I_{lim}$ (see FIG. 5). It should be appreciated, however, that the field current I is controlled to take the field current instruction value $I_f$ while the relation, field current instruction value $I_f$<field current limiting value $I_{lim}$, is established.

It should be noted that the second field current threshold $I_{th2}$ is set so that a temperature of the field winding type rotary electric machine 40 falls within a normal range while the field winding type rotary electric machine 40 is continuously operating. In this instance, the field current limiting value $I_{lim}$ is set to or below the second field current threshold value $I_{th2}$. Owing to these settings, it becomes possible to lower the temperature of the field winding type rotary electric machine 40 to a normally operable temperature in a more reliable manner.

Herein, in a case where the field current integral value S exceeds the field current integral threshold $S_{th}$, the field current limiting determination portion 142 clears the field current integral value S to 0.

When the field current limiting time $T_{lim}$ has elapsed since the limiting of the field current I started, the field current limiting instruction portion 143 stops sending the field current limiting value $I_{lim}$ to the field current control portion 110. In other words, the limiting of the field current I is released and the field current I is controlled according to the field current instruction value $I_f$.

An operation of the controller power supply connection determining portion 150 will now be described with reference to FIG. 6 through FIG. 8.

In the related art, when the IG signal 180 is switched OFF, the controller power supply connection determination portion 150 cuts off the connection between the controller 70 and the controller power supply 170 by switching OFF the controller power supply connection switch 160. However, for example, as is shown in FIG. 6, when a connection to the controller power supply 170 is cut off while the field current I is limited, measuring of the field current limiting time $T_{lim}$ using the field current limiting time counter value $C_{lim}$ is interrupted. Hence, even when the IG signal 180 is switched ON next time and a connection to the controller power supply 170 is switched to an ON state within a period during which the field current I is to be limited, the field current I is no longer limited. In such a case, it becomes impossible to limit the field current I at appropriate timing and elements may possibly break due to excessive heat generation.

To avoid such an inconvenience, the invention is configured in such a manner that the controller power supply connection determination portion 150 keeps the controller power supply connection switch 160 switched ON even when the IG signal 180 is switched OFF in a case where either one or both of the following conditions are satisfied:

(1) the field current integral value S is greater than 0; and
(2) the field current limiting time counter value $C_{lim}$ is greater than 0.

Figure 7:
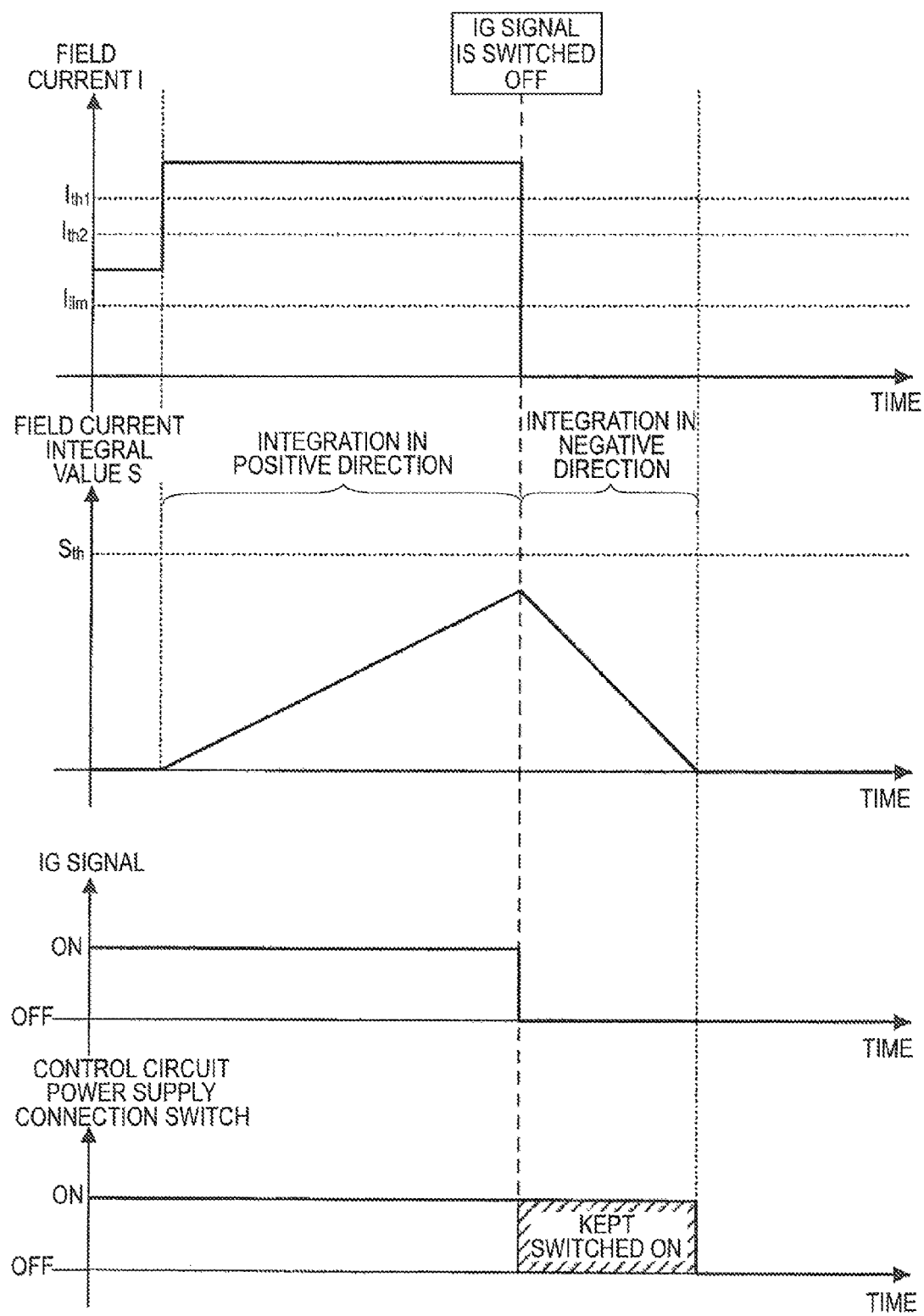
FIG. 7 is a view showing time changes of the IG signal and a controller power supply connection switch according to the first embodiment of the invention in a case where the field current integral value is greater than 0.

FIG. 7 shows an operation when the IG signal 180 is switched OFF in a case where the field current integral value S is greater than 0.

When the IG signal 180 is switched OFF, the controller power supply connection determination portion 150 determines whether the field current integral value S of the field current limiting determination portion 142 is greater than 0. In a case where the field current integral value S is greater than 0, the controller power supply connection determination portion 150 keeps the controller power supply connection switch 160 switched ON. Because the field current control stops when the IG signal 180 is switched OFF, the field current drops to 0 A and the difference $\Delta I_2$ between the second field current threshold $I_{th2}$ and the field current I (=0) is subtracted from the field current integral value S. The controller power supply connection determination portion 150 monitors the field current integral value S and keeps the controller power supply connection switch 160 switched ON until the field current integral value S decreases to 0. When the field current integral value S decreases to 0, the controller power supply connection determination portion 150 switches OFF the controller power supply connection switch 160 to cut off the connection to the controller power supply 170. In a case where the IG signal 180 is switched ON again while the controller power supply connection determination portion 150 keeps the controller power supply connection switch 160 switched ON, the controller power supply connection determination portion 150 continues to keep the controller power supply connection switch 160 switched ON according to the IG signal 180 independently of the field current integral value S.

An operation when the IG signal 180 is switched OFF when the field current limiting time counter value $C_{lim}$ is greater than 0 will now be described with reference to FIG. 8.

When the IG signal 180 is switched OFF, the controller power supply connection determination portion 150 determines whether the field current limiting time counter value $C_{lim}$ in the field current limiting instruction portion 143 is greater than 0. In a case where the field current limiting time counter value $C_{lim}$ is greater than 0, that is, in a case where the field current limiting time $T_{lim}$ has not elapsed, the controller power supply connection determination portion 150 keeps the controller power supply connection switch 160 switched ON until the field current limiting time counter value $C_{lim}$ decreases to 0 and the field current limiting time has elapsed. When the field current limiting time counter value $C_{lim}$ decreases to 0 and the field current limiting time $T_{lim}$ has elapsed, the controller power supply connection determination portion 150 switches OFF the controller power supply connection switch 160 to cut off the connection to the controller power supply 170. In a case where the IG signal 180 is switched ON again while the controller power supply connection determination portion 150 keeps the controller power supply connection switch 160 switched ON, the controller power supply connection determination portion 150 continues to keep the controller power supply connection switch 160 switched ON according to the IG signal 180 independently of the field current limiting time counter value $C_{lim}$.

In a case where both the field current integral value S and the field current limiting time counter value $C_{lim}$ are 0 when the IG signal 180 is switched OFF, the controller power supply connection determination portion 150 switches OFF the controller power supply connection switch 160 as soon as the IG signal 180 is switched OFF.

As has been described above, the second field current threshold $I_{th2}$ is set so that a temperature of the winding type rotary electric machine 40 falls within a normal range in a reliable manner while the field winding type rotary electric machine 40 is operating continuously. In contrast, the first field current threshold value $I_{th1}$ is set to a value with which the temperature of the field winding type rotary electric machine 40 rises beyond the normal range while the field winding type rotary electric machine 40 operates continuously. More specifically, when a difference between the field current I and the second field current threshold $I_{th2}$ is used for integration, the field current I is limited too early in comparison with a case where a difference between the field current I and the first field current threshold $I_{th1}$ is used for integration.

An addition of the field current integral value S can be performed through computation by an internal CPU (not shown) of the controller 70.

The IG signal 180 is a signal sent from the vehicle to the field winding type rotary electric machine 40 (the controller 70 thereof) to play a role of an activation signal of the controller 70.

The field current limiting time counter value $C_{lim}$ is a time measuring count value used in the field current limiting time measuring instrument 143a of FIG. 3.

The field current limiting time measuring instrument 143a counts down the field current limiting time counter value $C_{lim}$ at predetermined timing using an internally furnished subtraction counting function. The field current limiting instruction portion 143 sends the field current limiting value $I_{lim}$ to the field current control portion 110 while the field current limiting time counter value $C_{lim}$ is greater than 0 (that is, within the field current limiting time $T_{lim}$) and thereby limits the field current I.

Figure 6:
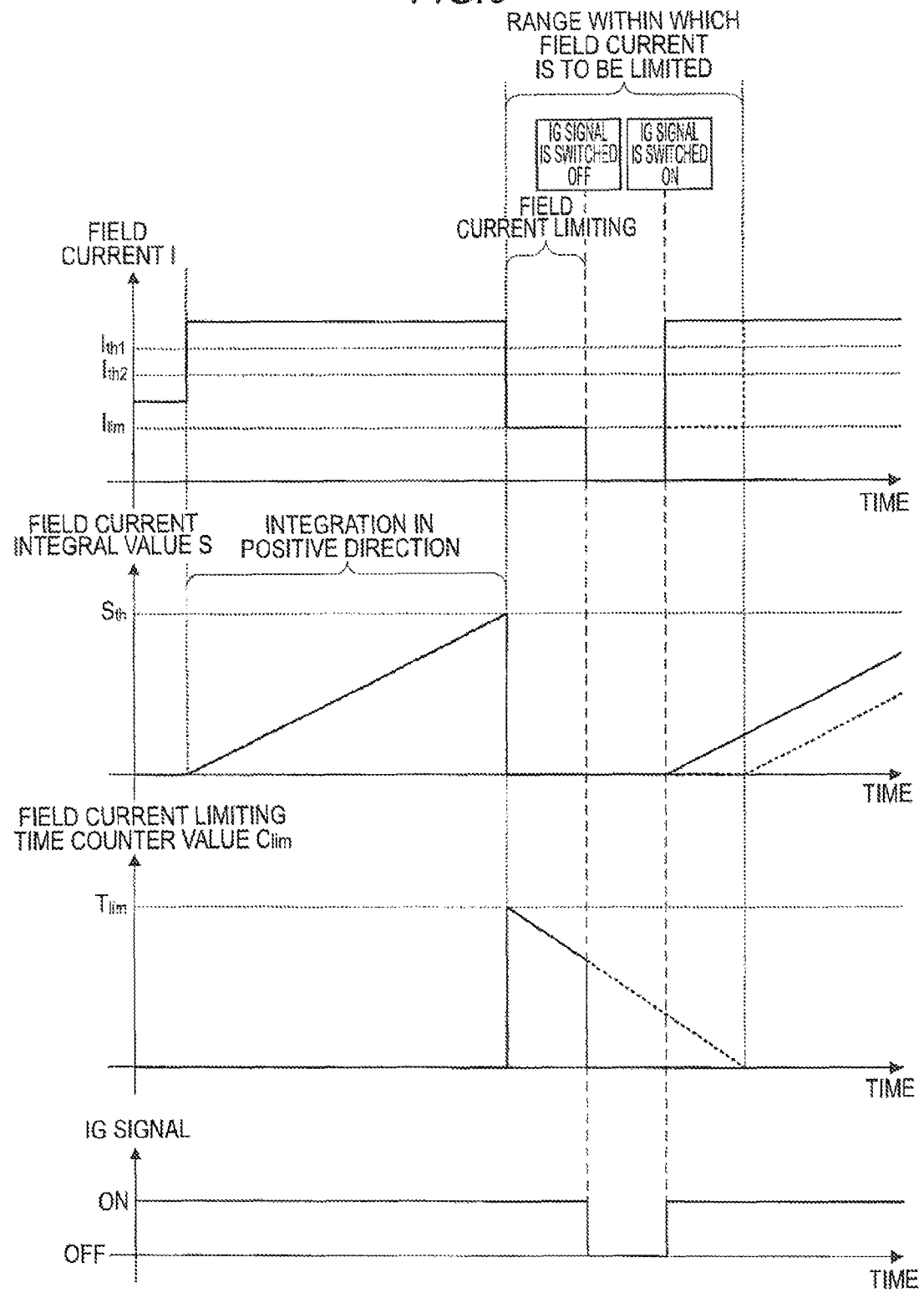
FIG. 6 is a view showing time changes of a field current, a field current integral value, a field current limiting time counter value, and an IG signal in the field current limiting portion according to the first embodiment of the invention in a case where the IG signal is switched OFF while the field current is limited.
Figure 8:
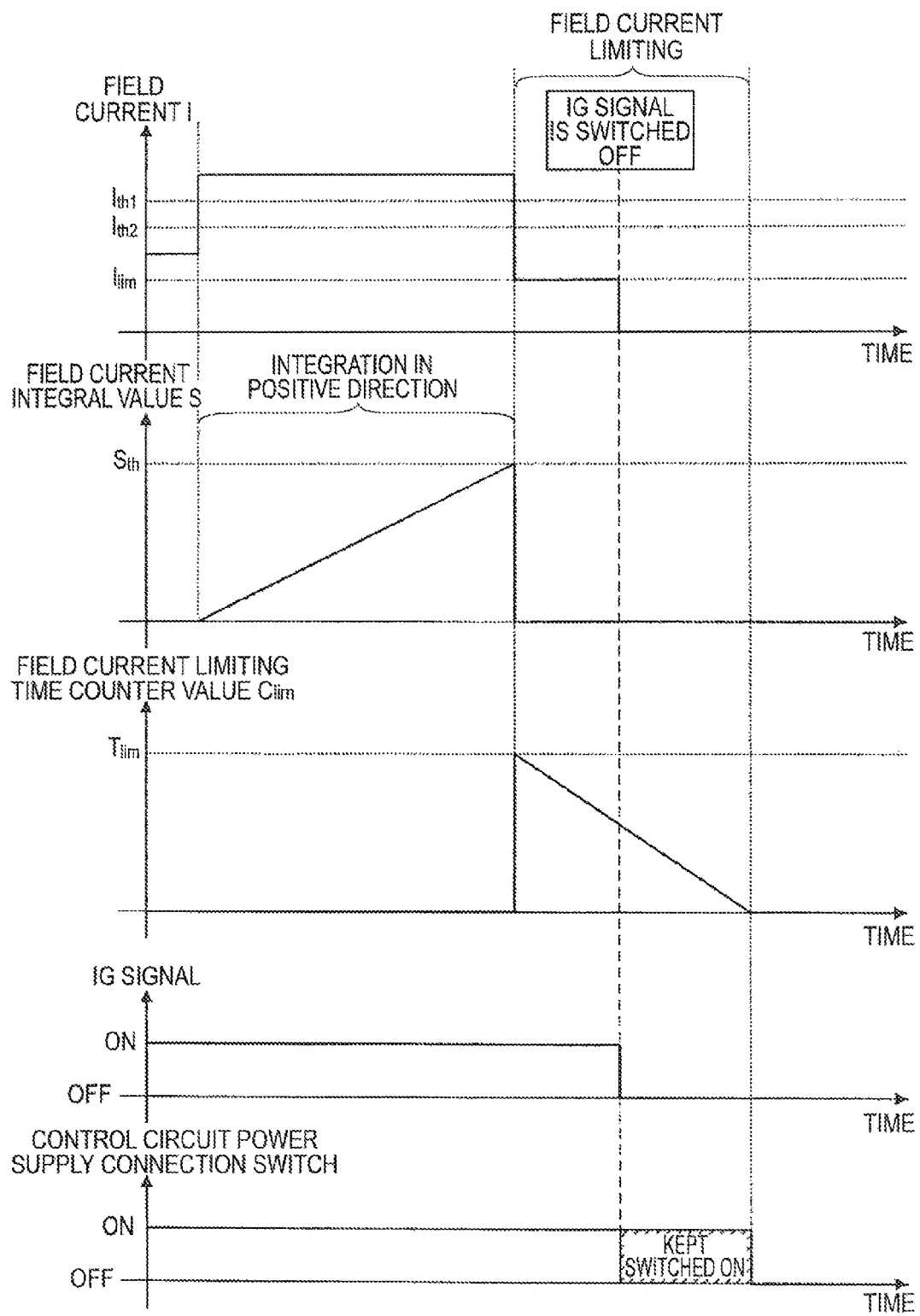
FIG. 8 is a view showing time changes of the IG signal and the controller power supply connection switch according to the first embodiment of the invention in a case where the field current limiting time counter value is greater than 0.

FIG. 6 shows an operation in a case without the configuration to keep the controller power supply connection switch 160 switched ON whereas FIGS. 7 and 8 show an operation with the configuration to keep the controller power supply connection switch 160 switched ON. When the IG signal 180 is switched ON while the control portion power supply connection switch 160 is kept switched ON in FIGS. 7 and 8, an operation is the same as the normal operation (an operation in a case where the IG signal 180 is switched ON continuously). As an advantage of this configuration, it becomes possible to continue the field current limiting processing because a connection to the controller power supply 170 is not cut off during the field current limiting processing. In a case where the IG signal 180 is switched ON after the controller power supply connection switch 160 is kept switched ON (when a state of being kept switched ON ends), an operation is the same as the normal power supply start-up operation and the connection to the controller power supply 170 is maintained until the field current limiting processing ends.

As has been described, according to the first embodiment described above, a rise in temperature of the field winding type rotary electric machine 40 is suppressed by forming the field winding type rotary electric machine 40 with: the motor generator 50 having the field winding 52; the field current detection portion 120 that detects a field current flowing to the field winding 52; the field current control portion 110 that controls the field current; the field current limiting determination portion 142 that calculates a field current integral value by integrating the field current over time and determines whether the calculated field current integral value has reached a predetermined field current integral threshold; the field current limiting instruction portion 143 that outputs an instruction to the field current control portion 110 to set the field current at or below a predetermined field current limiting value for a predetermined limiting time when it is determined that the calculated field current integral value has reached the predetermined field current integral threshold and outputs an instruction to change the predetermined limiting time in response to the field current; and the controller power supply connection switch 160 that switches ON and OFF the controller power supply 170 according to an instruction from the outside and information of the field current limiting determination portion 142 and the field current limiting instruction portion 143.

As has been described, according to the field winding type rotary electric machine of the first embodiment, in a case where the field current is limited according to a detection result of the field current flowing to the field winding so that a temperature of the field winding type rotary electric machine does not rise excessively, when the field current integral value, which is the limiting determination value of the field current, is greater than 0 or the field current is being limited, a connection between the controller and the controller power supply is switched to an ON state independently of an instruction from the outside and the ON state is maintained until the field current integral value decreases 0 and the limiting of the field current ends. Owing to this configuration, there can be achieved a significant advantage that it becomes possible to obtain a field winding type rotary electric machine capable of preventing damaged caused by a rise in temperature in a reliable manner.

Various modifications and alterations of this invention will be apparent to those skilled in the art without departing from the scope and spirit of this invention, and it should be understood that this is not limited to the illustrative embodiments set forth herein.

What is claimed is:

1. A field winding type rotary electric machine, comprising:
    a controller;
    a field current integration portion that is provided in the controller and calculates an integral value by integrating an excessive field current exceeding a field current threshold;
    a field current limiting portion that is provided in the controller and carries out limiting processing to limit a field current to or below a predetermined value when the integral value calculated by the field current integration portion reaches an integral value threshold defined as a reference value at or above which the field current is limited;
    a controller power supply connection switch that is switched ON and OFF for power feeding to the controller; and
    a controller power supply connection determination portion that switches ON and OFF the controller power supply connection switch and that maintains an ON state of the power feeding to the controller from start to end of the limiting processing by the field current limiting portion when the controller power supply connection determination portion receives a signal to switch OFF the controller power supply connection switch during the limiting processing.

2. The field winding type rotary electric machine according to claim 1, wherein
    the integral value is cleared to 0 when the integral value reaches the integral value threshold.

3. A field winding type rotary electric machine, comprising:
    a controller;
    a field current integration portion that is provided in the controller and calculates an integral value by integrating an excessive field current exceeding a field current threshold;
    a field current limiting portion that is provided in the controller and carries out limiting processing to limit a field current to or below a predetermined value when the integral value calculated by the field current integration portion reaches an integral value threshold defined as a reference value at or above which the field current is limited;
    a controller power supply connection switch that is switched ON and OFF for power feeding to the controller; and
    a controller power supply connection determination portion that switches ON and OFF the controller power supply connection switch and that maintains an ON state of the power feeding to the controller from start to end of the limiting processing by the field current limiting portion,
    wherein
    the integral value starts to gradually decrease when the limiting processing by the field current limiting portion starts and the ON state of the power feeding to the controller being maintained is released when the integral value decreases to 0.

4. The field winding type rotary electric machine according to claim 3, wherein
    the integral value starts to gradually decrease when the limiting processing by the field current limiting portion starts and the ON state of the power feeding to the controller being maintained is kept maintained while the integral value is greater than 0.

5. A field winding type rotary electric machine, comprising:
    a controller;
    a field current integration portion that is provided in the controller and calculates an integral value by integrating an excessive field current exceeding a field current threshold;
    a field current limiting portion that is provided in the controller and carries out limiting processing to limit a field current to or below a predetermined value when the integral value calculated by the field current integration portion reaches an integral value threshold defined as a reference value at or above which the field current is limited;
    a controller power supply connection switch that is switched ON and OFF for power feeding to the controller; and
    a controller power supply connection determination portion that switches ON and OFF the controller power supply connection switch and that maintains an ON state of the power feeding to the controller from start to end of the limiting processing by the field current limiting portion;
    wherein
    the integral value starts to gradually decrease when the limiting processing by the field current limiting portion starts and the ON state of the power feeding to the controller being maintained is kept maintained while the integral value is greater than 0.

6. A field winding type rotary electric machine, comprising:
    a controller;
    a field current integration portion that is provided in the controller and calculates an integral value by integrating an excessive field current exceeding a field current threshold;
    a field current limiting portion that is provided in the controller and carries out limiting processing to limit a field current to or below a predetermined value when the integral value calculated by the field current integration portion reaches an integral value threshold defined as a reference value at or above which the field current is limited;

a controller power supply connection switch that is switched ON and OFF for power feeding to the controller;

a controller power supply connection determination portion that switches ON and OFF the controller power supply connection switch and that maintains an ON state of the power feeding to the controller from start to end of the limiting processing by the field limiting portion; and a field current limiting time counter that is activated when the limiting processing by the field current limiting portion starts, wherein the ON state of the power feeding to the controller being maintained is released when the field current limiting time counter has repeated a predetermined number of counting actions.

7. The field winding type rotary electric machine according to claim 6, wherein the field current limiting time counter is a count-down counter; and the ON state of the power feeding to the controller being maintained is released when the field current limiting time counter counts down to 0.

8. The field winding type rotary electric machine according to claim 7, wherein the ON state of the power feeding to the controller is maintained since the field current limiting time counter is activated while a value in the field current limiting time counter is greater than 0.

9. The field winding type rotary electric machine according to claim 8, wherein the integral value is cleared to 0 when the integral value reaches the integral value threshold.

10. A field winding type rotary electric machine, comprising:

a rotary electric machine having a field winding;

a field current detection portion that detects a field current flowing to the field winding;

a field current control portion that controls the field current;

a field current limiting determination portion that computes a determination value on the basis of the field current detected by the field current detection portion and determines whether the determination value has reached a predetermined determination threshold;

a field current limiting instruction portion that instructs the field current control portion to limit the field current to a predetermined allowable value in a case where the field current limiting determination portion determined that the determination value has reached the predetermined determination threshold; and a control circuit power supply connection switch that switches ON and OFF a power supply of a control circuit of the rotary electric machine according to an instruction from an outside, wherein the field current limiting determination portion calculates, while the field current detected by the field current detection portion remains greater than a predetermined field current threshold, an integral value for determination by integrating a difference between the predetermined field current threshold and the field current over time as the determination value;

the field winding type rotary electric machine further comprises a field current integration portion that calculates a subtraction integral value by integrating a difference between the field current and the predetermined field current threshold over time while the field current detected by the field current detection portion remains equal to or smaller than the predetermined field current threshold and updates the determination value by subtracting the subtraction integral value from the integral value for determination;

the field winding type rotary electric machine switches ON the control circuit power supply connection switch independently of the instruction from the outside in one of cases where the determination value of the field current limiting determination portion is greater than 0 and where the field current limiting instruction portion sends a limiting instruction on the field current to the field current control portion; and the control circuit power supply connection switch is kept switched ON until the predetermined value calculated by the field current integration portion decreases to 0 and the limiting instruction on the field current from the field current limiting instruction portion to the field current control portion is removed.

* * * * *